J. J. GROBE.
HOLDER FOR THREAD CUTTING DEVICES.
APPLICATION FILED MAR. 17, 1917.
1,277,915.
Patented Sept. 3, 1918.
2 SHEETS—SHEET 1.
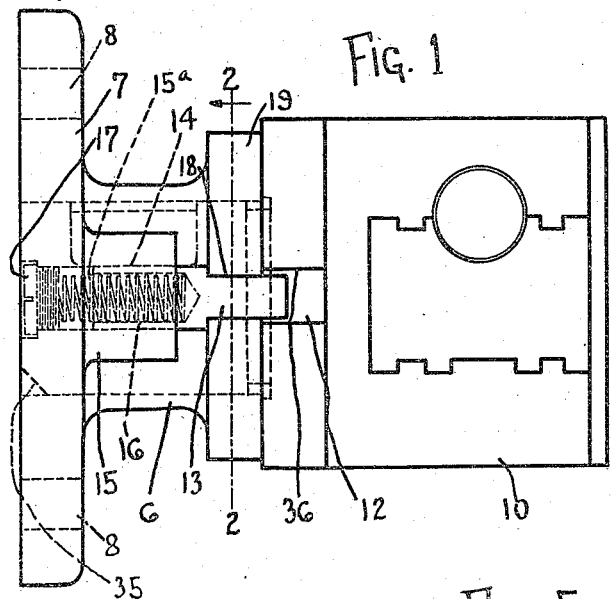
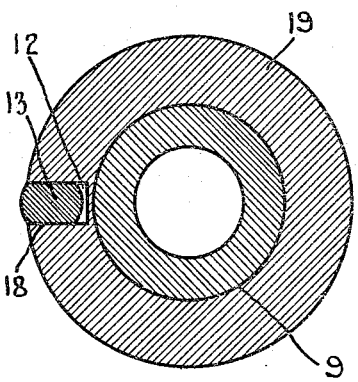
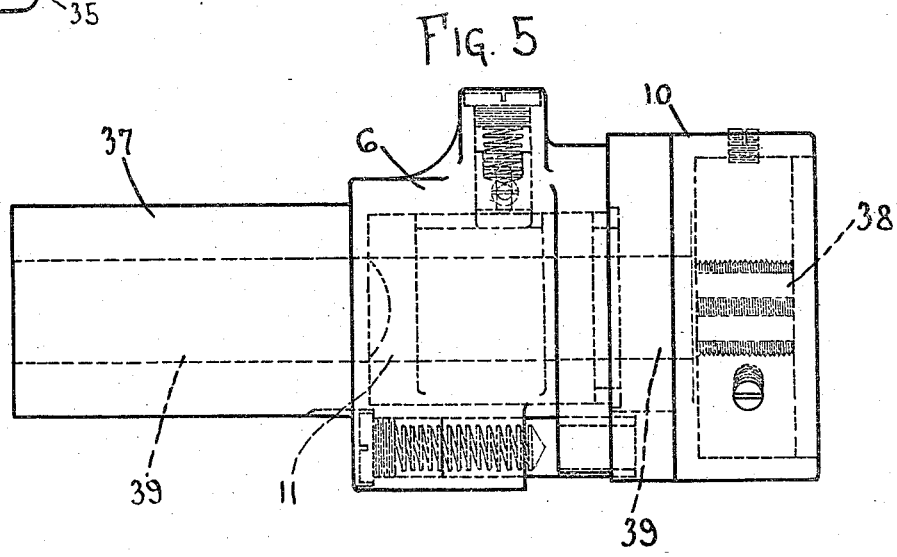
WITNESS
INVENTOR.
Julius J. Grobe
BY
Dyrenforth, Lee, Chritton and Wiles
ATTORNEY J. J. GROBE.
HOLDER FOR THREAD CUTTING DEVICES.
APPLICATION FILED MAR. 17, 1917.
1,277,915.
Patented Sept. 3, 1918.
2 SHEETS—SHEET 2.
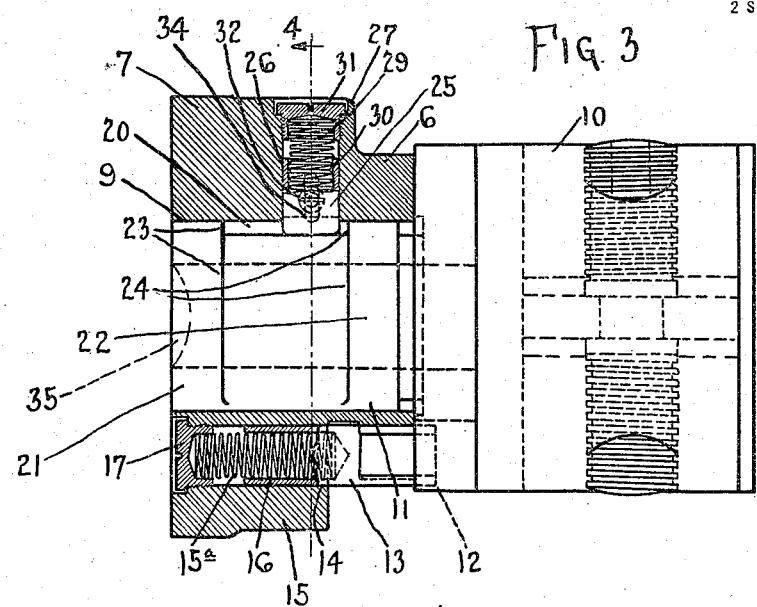
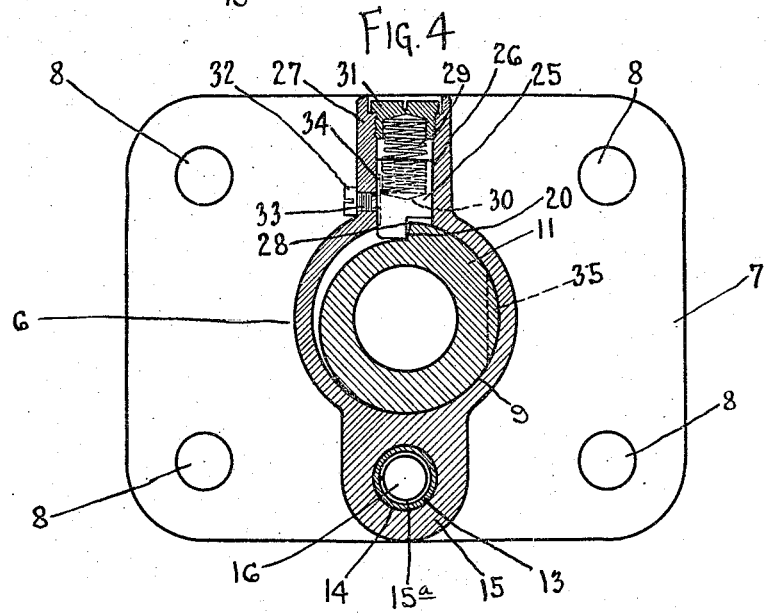

UNITED STATES PATENT OFFICE.

JULIUS J. GROBE, OF CHICAGO, ILLINOIS, ASSIGNOR OF ONE-HALF TO JAMES S. THELEN, OF CHICAGO, ILLINOIS.

HOLDER FOR THREAD-CUTTING DEVICES.

1,277,915.     Specification of Letters Patent.     Patented Sept. 3, 1918.

Application filed March 17, 1917. Serial No. 155,409.

Be it known that I, JULIUS J. GROBE, a citizen of the United States, residing at Chicago, in the county of Cook and State of Illinois, have invented a new and useful Improvement in Holders for Thread-Cutting Devices, of which the following is a specification.

My invention relates, more particularly, to the means for holding thread-cutting elements, such as taps or thread-cutting dies, in operative position on a lathe for effecting the formation of the threads.

Machines for cutting threads, as commonly provided, involve a driven rotatable element in which the piece of work to be threaded is secured to be rotated in engagement with a tap when internal threads are to be formed in the work, and in engagement with a thread-cutting die when external threads are to be formed on the work, the member which carries the tap or die, as the case may be, being movable along the bed of the machine longitudinally of the work. In the operation of cutting a thread, the tap or die-supporting member is first moved to a position in which the tap or die engages the work and commences to cut a thread in or upon the latter. The threads thus cut tend, by their screw action on the cutting edges of the tap or die, to draw the latter, together with its supporting member, toward the work at a speed proportional to the pitch of the thread being cut. The member which carries the tap, or die, and which moves along the machine as stated, usually, coöperates with stop-means which operate to arrest the movement of this member at a particular point on the machine depending on the length of thread to be cut. At the conclusion of the thread-cutting operation, the direction of rotation of the work is reversed and the tap, or die, is thus unscrewed from the work.

The holder devices as hitherto constructed involve a rotatable member which directly supports the tap, or die, this member being longitudinally movable in the member in which it is journaled, these two members being provided with coöperating stop-surfaces engageable, respectively, when said longitudinally adjustable member is shifted into its extreme positions, certain of these stop-surfaces serving to hold the tap, or die, and the said member directly carrying it, against rotation in the operation of cutting the thread, and the other stop-surfaces serving, when mutually engaging to hold the said member against rotation in the opposite direction in the operation of backing off the tap, or die. With the die or tap holder constructed in accordance with common practice, the threading operation is usually performed in the following manner: With the work rotating in the correct direction, the tap, or die, together with its supporting member, is brought into engagement with the work and at once starts to cut the thread, the tap, or die, being held against rotation by the two coöperating stop-surfaces at the forward end of the holder. As the threads are cut the tap, or die, tends to move farther into, or on, the work. The member supporting the die, or tap-holding, head is then manually moved so as to follow the movements of the thread-cutting member to such a degree as to prevent the disengagement of the two forward stop surfaces. The longitudinal shift, before referred to, comes into action, in this connection, in allowing the tap, or die, together with the central member, immediately supporting it to "float" longitudinally to a limited degree in the cylindrical member by which the tap, or die, holder is clamped into position on its supporting member. As before described when the threading operation has proceeded the desired extent, a stop coöperating with the supporting member comes into play and stops the manual "follow up" of the thread-cutting member by the supporting member.

The tap or die together with the "floating" portion of the holder will continue to be drawn forward by the screw action of the threads on the thread-cutting edges until the stop-surfaces, already referred to, disengage, when the tap, or die, and the "floating" portion of the holder, will continue to rotate with the work until the machine is stopped. The direction of rotation of the work is now reversed and the supporting member moved away from the work until the two rear stop-surfaces come into mutual engagement, when the tap, or die, will again be held against rotation. The tap, or die, will now tend to unscrew itself from the work, the operator assisting to the best of his ability by manually applying power to move the die, or tap, holder and its supporting member, away from the work.

The main objections, against this type of tap, or die-head, can all be traced to the following features in the design of the "reverse-motion" stop-surfaces. The head is so designed that it must be fully extended in a forward direction before the reverse-motion stop-surfaces engage. Another feature of disadvantage is that once these stop-surfaces are engaged there is absolutely no longitudinal "floating" motion of the floating part, in the cylindrical member which is clamped to the supporting member.

The disadvantages connected with the first objectionable feature are due entirely to the fact that to start the backing-out operation requires a simultaneous movement of the manual control of the supporting member and of the manual control for reversing the direction of the rotation of the work. As can be readily appreciated the necessary skill for making these movements simultaneously comes only, if at all, after a very great amount of experience. If the operator does not time these movements accurately he will either reverse the rotation of the work before the reverse-motion stops on the tap, or die-head, are in engagement, or vice versa. If he reverses the rotation of his work before engaging the "reverse-motion" stop, the die, or tap, together with the normally "floating" portion of the head will continue to rotate with the work-reversing when the latter is reversed. These parts will gather momentum aggravated by the fact that most machines are so arranged that the reverse motion is much faster than the forward motion. Now when the die, or tap, head is fully extended by the backing out of its supporting member, the floating portion being held stationary by being in engagement with the work, the tongue, or pin, forming one of the locking surfaces, will rotate two or three times while already in contact with the cam-portion forming the other locking surface owing to the momentum gathered before the head was fully extended. Eventually, however, the stops do act bringing the tap, or die, to a stop instantly.

When the tongue, or pin, is riding over the cam-surfaces before going fully home, a stress is applied tending to draw the tap, or die, straight away from the work. In case of a small tap in a tap-holder this action will sometimes pull the tap apart. In case of a larger diameter tap cutting fine threads in a fairly tough material, such as brass, or cutting even relatively coarse threads in fragile material, such as rubber, the threads will almost always be sheared off. If on the other hand a die is being used, threads will be sheared off in fragile material or even in tough material, such as brass, when fine threads are being cut on large diameter stock. When the work is done on small diameter stock, the threads in fragile material will still shear but when the stock is tough brass, it will generally twist entirely off instead of merely shearing the threads, especially when the threads being cut, are relatively coarse. When the tongue, or pin has finally gone home it stops the rotation of the tap, or die holder instantly and the work, together with the spindle and its associated parts, continues to rotate. The tap is in a way frictionally engaged with the work so that the strain of this instantaneous stop comes directly on the tap and will twist this member off, especially when the latter is of small diameter or the tapped hole is very deep. This danger, of course, becomes greater the higher the speed of rotation just before the instantaneous stop.

In the other case possible, namely when the operator first extends the die, or tap, head fully and then reverses the direction of rotation of the work, only one evil effect is present, namely the pulling strain tending to draw the tap, or die, straight out from the work—generated when the pin or tongue passes over its coöperating cam-surface before the direction of rotation of the work is reversed. The effects of this strain will be exactly the same as explained before in connection with the preceding case—namely shearing of threads, or stock, and breaking of taps. The disadvantages connected with the second point—namely the loss of the longitudinal floating action, when once the stop-surfaces are engaged are as follows:

When once the stop-surfaces are engaged the entire tap, or die, head and supporting member practically form one piece. When the "backing out" operation is being performed the tap, or die, is unscrewed and the tap, or die, head is forced backward at a rate proportional to the pitch of the thread that was cut. Now as the head and its supporting element are practically one piece it follows that this entire mechanism must be moved back at the necessary speed. It is practically impossible for the operator to move this mechanism backward at exactly the correct speed for any length of time so that, to a greater or less extent, the actual strain of moving the mechanism comes on the threads and on the thread cutting members. When the mechanism is very heavy, as is often the case—the weight sometimes running as high as a number of hundreds of pounds or when the threads are fine, or when threads are run for a long distance on the work, or when cut on fragile material—stripping usually results so that in some cases the cutting of threads under these circumstances is not attempted.

My primary objects are to overcome the difficulties and objections as above pointed out, and to provide a construction of holder whereby loss due to ruined work, or to broken thread-cutting elements, especially taps, will be minimized, if not entirely eliminated regardless of the character and size of thread-cutting machine employed and regardless of the fineness of thread, the diameter of part to be threaded or the kind of material on which threads are desired to be formed; to provide a holder device by which the results just stated may be produced without requiring exceptional skill and painstaking attention on the part of the operator; to accomplish these objects by a construction which shall be simple of construction and economical of manufacture; to provide, in the use of the holder in a turret lathe, for the prevention of the disengagement of the rotatable portion of the means which hold the thread-cutting elements, from the other parts thereof by the action of centrifugal force, in the rotating of the turret to bring different tools carried thereby into operative position; to provide a holder which shall be adapted for holding a tap or thread-cutting die, as desired, and permit of the relatively rapid interchange of these thread-cutting devices; and other objects as will be apparent from the following description.

Referring to the accompanying drawings:

Figure 1 is a view in side elevation of a holder constructed in accordance with my invention.

Fig. 2 is a section taken at the line 2—2 on Fig. 1 and viewed in the direction of the arrow.

Fig. 3 is a view, similar to Fig. 1, viewing the holder at an angle of 90° to the point at which the construction is viewed in Fig. 1, certain of the parts being shown in section.

Fig. 4 is a section taken at the line 4 on Fig. 3 and viewed in the direction of the arrow; and Fig. 5, a view like Fig. 1 showing the invention embodied in a slightly different type of holder.

As a preface to the following description it may be stated that according to the construction shown in Figs. 1, 2, 3, and 4, the holder is provided for flatwise attachment, as by bolts or screws, to one of the faces of the tool holding member of a turret lathe, and the holder is shown as adapted to receive a tap; and according to the particular construction illustrated in Fig. 5, the holder is provided of a form adapting it to fit, at a shank thereon, the openings commonly provided in the tool-carrying members of lathes and be held therein, the portion of the holder which presents the thread-cutting element being equipped with the usual die for producing threads upon the external surfaces of the work, though, as will be readily understood from the following there is no intention thereby to limit the invention to the particular association of parts shown.

Referring particularly to Figs. 1 to 4, 6 represents a member provided at one end with a plate section 7 containing openings 8 at which it is adapted to be clamped to the tail-piece of a thread-cutting machine, as for example to one face of the turret of a turret lathe. The portion of the member 6 which extends laterally from the plate section 7 is of general cylindrical form and contains a cylindrical opening therethrough as represented at 9. The member 6 receives in its opening 9, and rotatably supports, a head 10 preferably of general cylindrical form having a shank portion 11 extending longitudinally therefrom at one end, this shank being of reduced diameter and preferably concentric with the member 10 and by which this member is supported on the member 6 to be longitudinally movable, and rotatable, in the latter. The member 10 in the form shown in the figures now being considered, is adapted for releasably holding in position a thread-cutting tap (not shown) of any suitable construction and as commonly used and in which construction the tap would be held to extend beyond the right-hand end of the member 10 in Fig. 3 by the tap-clamping jaws of the clamping means which are adjustable to adapt the holder for different sizes of taps. If desired the member 10 may, instead of being provided with clamping jaws for taps, be constructed to receive die-members, usually adjustable for cutting threads in accordance with common practice, the holder of Fig. 5, hereinafter more fully referred to, being shown as of a form adapting it for the holding of thread-cutting dies.

The member 10 contains in its periphery, adjacent the member 6, a longitudinally extending slot 12 adapted to coöperate with a pin 13 slidingly confined in a socket 14 formed in a boss 15 extending radially from the cylindrical portion of the member 6, the pin being backed up by a spring 15ᵃ which preferably partly extends into a socket 16 in the pin 13 and is confined between the end wall of this socket and a plug 17 screwed into the member 7 and forming the end wall of the socket 14, the right hand end of this pin being preferably of reduced width with flat sides, as represented, at which portion it slides in a slot 18 in the peripheral portion of an annular flange 19 forming a part of the member 6, and extends into the slot 12, for a purpose hereinafter described.

The shank 11 is provided on its periphery with a shoulder 20 extending lengthwise thereof, as represented in Fig. 4, this shoulder being preferably provided in the circumferential exterior portion of the shank 11 and intermediate the ends of the latter, with the portion of the exterior surface of the shank 11 leading up to the base of the shoulder 20, of involute form as shown, this involute portion extending between the cylindrical portions 21 and 22 of the shank 11 and presenting the shoulder-portions 23 and 24, respectively, which extend circumferentially part way around the shank. The shoulder 20 coöperates with a member 25, in the form of a pin which is reciprocally confined in a socket 26 located in the member 6 and in a boss 27 connected with, and extending radially of, the member 6. The member 25 has a portion adapted to interlock with the shoulder 20 when force is applied to the member 11 tending to rotate it in an anti-clockwise direction in Fig. 4, this shoulder, in the particular construction illustrated being represented at 28 and formed by cutting away the inner end of the pin 25 as illustrated. The pin 25 is normally pressed to the position illustrated in Figs. 3 and 4 by a coiled spring 29 confined between the end wall of a socket 30 formed in the pin 25 and into which said spring extends, and a plug 31 screwed into the boss 27 and forming an end wall of the socket 26, the pin 25 being held against turning by a guide pin 32 which is secured at its threaded portion 33 in the boss 27 and extends at its inner end into a slot 34 in the side wall of the pin 25.

Assuming the parts 6 and 10 to be disconnected, the user assembles these parts by introducing the shank 11 into the opening 9, the outer end of the shank being beveled as indicated at 35 to force the pin 25 to a position in which it will not obstruct the assembling of these parts, the part 10 being adjusted on the part 6 to a position in which the right hand end of the pin 13 in Fig. 1 will extend into the slot 12, it being understood that the parts may be thus assembled whether or not the member 6 is bolted to the turret or is to be bolted in place after the parts are assembled. Assuming the holder to be applied to operative position on a lathe and having a thread-cutting tap secured therein, the engagement of the tap with the work in the thread-cutting operation tends to rotate the member 10 in a clockwise direction in Fig. 2 thus causing the wall 36 of the slot 12 to interlock with the pin 13 by engagement with which the member 10 is held stationary during the thread-cutting operation, the member 6 in the thread-cutting operation being caused, by force exerted against it other than through the member 10, to follow the latter to hold the pin 13 and wall 36 in interlocking relation. In the movement of the member 6 into engagement with the stop-means (not shown) which are usually provided on lathes as hereinbefore explained, the movement of the member 6 toward the work is arrested, but as the member 10 is free to move lengthwise, it will, in the continued movement of the work-carrying rotatable member, due to inertia of the latter after the power is shut off, move away from the member 6 thereby avoiding the exertion of undue stress upon the thread-cutting element, or the parts with which it is connected, or by which it is carried. At the conclusion of the thread-cutting operation the operator backs off the part of the machine to which the member 6 is connected as hereinbefore stated, the operator having previously reversed the rotation of the work-driving member which tends to rotate the member 10 in anti-clockwise direction in Fig. 4, the member 10 being held against rotation in this direction by engagement of the shoulder 28 of the pin 25 with the surface 20. According to the particular construction illustrated, if the member 10 is not drawn away from the member 6 in the "over-running" movement of the work-carrying member as hereinbefore stated, sufficiently to disengage the pin 13 from the shoulder 36, the shoulder 28 will engage the shoulder 20 immediately upon the reversal of the rotation of the member 10 to rotate it in an anti-clockwise direction in Figs. 2 and 4, but if the pin 13 has moved out of engagement with the shoulder 36 and the part 10 has rotated a part of a revolution on the member 6, which is usually the case in practice, the shoulder 28 will not engage the shoulder 20 until the reverse rotation of the member 10, throughout less than a revolution, brings these shoulders into interlocking relation.

As the member 10 moves away from the work in the unscrewing of the tap, or die, from the threads previously formed on the work, the operator shifts the member of the lathe carrying the part 6, lengthwise along the machine in the same direction as that in which the member 10 moves as stated. Inasmuch as the shoulder 20 is relatively long compared with the length of the shoulder 28, the interlocking engagement between these parts is maintainable throughout a relatively great degree of adjustment of the parts 6 and 10 longitudinally of each other, or in other words the part 6 may occupy different positions of spaced relation to the member 10 while maintaining engagement between the coöperating shoulders 20 and 28. By reason of this fact the operator merely by observing in a rough way the distance which he maintains between the adjacent ends of the members 6 and 10 in the backing off operation, may entirely free the threads cut in the work, from any pressure due to the resistance of parts of the machine excepting the portion 10 thereof, which is almost negligible.

It will also be noted that the surfaces 20 and 28 are so arranged relative to the pin 13 and the surface 36, that at the conclusion of the operation of withdrawing the tap, or die, from the previously cut thread, the pin 13 will extend in line with the slot 12 and thus the parts are always in a position at the beginning of a new cutting operation, to immediately engage, to avoid loss of time in the cutting operation, upon the shifting of the member 6 toward the member 10.

It will also be noted that with the parts of the holder in the position they assume, as stated, upon the conclusion of the operation of withdrawing the tap, or die, from the threads, the pin 25 is interposed between the two shoulders 23 and 24 the shoulder 23 operating as a stop to prevent the throwing off of the member 10 from the member 6 as for example by rotation of a turret to which the holder is attached.

By preference the shoulder 20 is disposed at an angle to the radius of the circle described by the exterior surface of the shank 11, and thus the interlocking of the shoulder 28 therewith is at the base of the shoulder 20 which prevents the circumferential portion of the shank 11 from being pounded out of shape which would impair the desired journal connection between the parts 6 and 10.

Referring more particularly to the construction illustrated in Fig. 5, it is the same as that illustrated in the previous figures excepting that the member 6, instead of being provided with the plate attaching portion 7, is provided with a shank 37 adapted to enter the opening of the turret of a lathe or the opening provided in any other form of tail-piece, and the member 10 instead of being provided with clamping means for a tap, is equipped with a thread-cutting die in accordance with common practice. It may be stated in this connection that in practice the part 10 of Figs. 3 and 5 may be used interchangeably in either of the members 6 of these figures.

In the construction illustrated in Fig. 5 the entire holder is longitudinally centrally apertured as indicated at 39, this opening not only extending between the members of the thread-cutting die 38, but also through the body of the member 10, shank 11, member 6 and shank 37 thereof, the pipe or bar as the thread-cutting operation continues entering this opening and thus the pipes and bars may be threaded for any desired length.

In connection with the feature of removing the members 10 from the members 6, as for example to interchange a tap-holder for a die-holder, the operator would slide the member 10 away from the member 6 to withdraw the pin 13 from the slot 12 and would then rotate the member 10 in a clockwise direction in Figs. 2 and 4 to a position in which the pin 25 is cammed by the involute portion of the shank 11 hereinbefore referred to, to a position in which it rests against the cylindrical portion of the shank 11 which permits the members 6 and 10 to be completely disengaged.

While I have illustrated and described certain constructions wherein my invention is embodied, I do not wish to be understood as thereby intending to limit it thereto, as various modifications and alterations may be made without departing from the spirit of my invention, it being my intention to claim my invention as fully and completely as the prior state of the art will permit.

What I claim as new and desire to secure by Letters Patent is:—

A holder for a thread-cutting element comprising a bearing member adapted to be secured to a rotating element and presenting a bearing surface of uniform, relatively large, diameter and of relatively short length, a second member mounted in said bearing surface to be rotatable and longitudinally movable therein, means for holding said second member against rotation in one direction consisting of a spring-pressed pin on one of said members and extending lengthwise of the axis of the holder and a shoulder on the other of said members with which said pin coöperates, and means for preventing rotation of said second member in the other direction comprising a shoulder on said second member extending lengthwise thereof and located within said bearing surface, with a recessed cam surface leading up to said shoulder and a coöperating spring-pressed pin on said bearing member operating to engage said cam surface and gradually move from a position wherein it is free of said cam surface to a position wherein it engages said shoulder, and stop means on said second member for engaging said last-named pin and preventing accidental separation of said members longitudinally, said stop means inset from the end of said second member, a sufficient distance to afford a relatively broad bearing of said member in said bearing member when said stop means engage said second-named pin.

JULIUS J. GROBE.

Copies of this patent may be obtained for five cents each, by addressing the "Commissioner of Patents, Washington, D. C."